United States Patent
Mondal et al.

(10) Patent No.: US 10,508,532 B1
(45) Date of Patent: Dec. 17, 2019

(54) EFFICIENT RECOVERY OF PETROLEUM FROM RESERVOIR AND OPTIMIZED WELL DESIGN AND OPERATION THROUGH WELL-BASED PRODUCTION AND AUTOMATED DECLINE CURVE ANALYSIS

(71) Applicant: QRI GROUP, LLC, Houston, TX (US)

(72) Inventors: Anirban Mondal, Shaker Heights, OH (US); David Castiñeira Areas, Houston, TX (US); Hamed Darabi, Houston, TX (US); Sébastien François Matringe, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 865 days.

(21) Appl. No.: 14/836,564

(22) Filed: Aug. 26, 2015

Related U.S. Application Data

(60) Provisional application No. 62/042,326, filed on Aug. 27, 2014.

(51) Int. Cl.
*E21B 47/00* (2012.01)

(52) U.S. Cl.
CPC .................. *E21B 47/00* (2013.01)

(58) Field of Classification Search
CPC ........................................ E21B 47/00
See application file for complete search history.

(56) References Cited

U.S. PATENT DOCUMENTS

| | | |
|---|---|---|
| 3,035,440 A | 5/1962 | Reed |
| 5,984,010 A | 11/1999 | Elias et al. |
| 6,101,447 A | 8/2000 | Poe |
| 7,079,952 B2 | 7/2006 | Thomas et al. |
| 7,289,942 B2 | 10/2007 | Yang et al. |
| 7,445,041 B2 | 11/2008 | O'Brien |
| 7,556,099 B2 | 7/2009 | Arthur et al. |
| 7,798,219 B1 | 9/2010 | Harnoy |

(Continued)

OTHER PUBLICATIONS

U.S. Appl. No. 13/282,297, filed Oct. 26, 2011, Final Office Action dated Dec. 30, 2015.

(Continued)

*Primary Examiner* — Alexander Satanovsky
*Assistant Examiner* — Mark I Crohn
(74) *Attorney, Agent, or Firm* — Workman Nydegger

(57) ABSTRACT

Embodiments are directed to automatically detecting an event in a production curve, generating a production estimate using a quantile regression and to performing a probabilistic decline curve analysis. In one scenario, a computer system identifies a candidate break point in a production decline curve which represents a decline in material production at a well. The computer system identifies one trend for the production decline curve occurring before the candidate break point and identifies a second trend for the production decline curve occurring after the candidate break point. The computer system calculates the difference between the first material production decline estimate and the second material production decline estimate and identifies the candidate break points where the difference between the first material production decline estimate and the second material production decline estimate is beyond a threshold value. Identifying the candidate break points allows generation of accurate material production forecasts for the well.

10 Claims, 9 Drawing Sheets

(56) References Cited

U.S. PATENT DOCUMENTS

| | | | |
|---|---|---|---|
| 7,890,264 | B2 | 2/2011 | Elphic |
| 7,963,327 | B1 | 6/2011 | Saleri et al. |
| 8,145,427 | B1 | 3/2012 | Saleri et al. |
| 8,145,428 | B1 | 3/2012 | Saleri et al. |
| 8,195,401 | B2 | 6/2012 | Ella et al. |
| 8,209,202 | B2 | 6/2012 | Narayanan et al. |
| 8,880,422 | B1 | 11/2014 | Lehmann et al. |
| 2001/0015133 | A1 | 8/2001 | Sakai et al. |
| 2001/0037983 | A1 | 11/2001 | Takahashi et al. |
| 2002/0013687 | A1 | 1/2002 | Ortoleva |
| 2002/0120429 | A1 | 8/2002 | Ortoleva |
| 2003/0225606 | A1 | 12/2003 | Raghuraman et al. |
| 2004/0015376 | A1 | 1/2004 | Zhu et al. |
| 2004/0158406 | A1 | 8/2004 | Harrison |
| 2004/0220846 | A1 | 11/2004 | Cullick |
| 2005/0038603 | A1 | 2/2005 | Thomas et al. |
| 2005/0149307 | A1 | 7/2005 | Gurpinar et al. |
| 2005/0209912 | A1 | 9/2005 | Veeningen et al. |
| 2006/0224369 | A1 | 10/2006 | Yang et al. |
| 2006/0289157 | A1 | 12/2006 | Rao |
| 2007/0016389 | A1 | 1/2007 | Ozgen |
| 2007/0028417 | A1 | 2/2007 | Crichlow |
| 2007/0143025 | A1 | 6/2007 | Valdez et al. |
| 2007/0284107 | A1 | 12/2007 | Crichlow |
| 2008/0052097 | A1 | 2/2008 | Bouzas et al. |
| 2008/0091283 | A1 | 4/2008 | Balci et al. |
| 2008/0252898 | A1 | 10/2008 | Pfaff |
| 2008/0262898 | A1 | 10/2008 | Tonchev et al. |
| 2009/0005630 | A1 | 1/2009 | Yokoyama et al. |
| 2009/0037115 | A1 | 2/2009 | Magill et al. |
| 2009/0084545 | A1 | 4/2009 | Banerjee et al. |
| 2009/0133871 | A1 | 5/2009 | Skinner et al. |
| 2009/0313772 | A1 | 12/2009 | Talley |
| 2010/0057418 | A1 | 3/2010 | Li et al. |
| 2010/0082142 | A1 | 4/2010 | Usadi et al. |
| 2010/0204972 | A1 | 8/2010 | Hsu et al. |
| 2010/0300682 | A1* | 12/2010 | Thakur .................. E21B 43/00 166/250.01 |
| 2011/0014088 | A1 | 1/2011 | Zubrin et al. |
| 2011/0054869 | A1 | 3/2011 | Li et al. |
| 2011/0067443 | A1 | 3/2011 | Martinez et al. |
| 2011/0168391 | A1 | 7/2011 | Saleri et al. |
| 2011/0290479 | A1 | 12/2011 | Izgec |
| 2012/0101759 | A1 | 4/2012 | Rai et al. |
| 2012/0232865 | A1 | 9/2012 | Maucec et al. |
| 2012/0292055 | A1 | 11/2012 | Swist |
| 2013/0048279 | A1 | 2/2013 | Appel et al. |
| 2013/0110474 | A1 | 5/2013 | Saleri |
| 2013/0110524 | A1 | 5/2013 | Saleri et al. |
| 2013/0110563 | A1 | 5/2013 | Saleri |
| 2013/0110571 | A1 | 5/2013 | Saleri et al. |
| 2013/0151159 | A1 | 6/2013 | Pomerantz et al. |
| 2013/0161502 | A1 | 6/2013 | Pomerantz et al. |
| 2013/0338987 | A1 | 12/2013 | Cheng et al. |
| 2014/0310071 | A1* | 10/2014 | Conradson ....... G06Q 10/06375 705/7.37 |

OTHER PUBLICATIONS

U.S. Appl. No. 13/282,315, filed Oct. 26, 2011, Office Action dated Mar. 9, 2016.

U.S. Appl. No. 14/604,330, filed Jan. 23, 2015, Matringe et al.

U.S. Appl. No. 14/604,367, filed Jan. 23, 2015, Matringe et al.

Batavia, "Front-End Loading for Life Cycle Success", Offshore Technology Conference Paper No. OTC-12980; Published Apr. 2001.

BDM-Oklahoma, Inc., "Feasability Study of Heavy Oil Recovery in the United States", U.S. Department of Energy, Document No. NIPER/BDM-0225; Published Mar. 1995.

Burns et al., "Gas Field Development: Automatic Selection of Locations for New Producing Wells", Society of Petroleum Engineers, Document No. SPE-2429; Published 1969.

Fiksel et al., "Measuring Progress Towards Sustainability Principles, Process, and Best Practices", 1999 Greening of Industry Network Conference Best Practice Proceedings.

Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.

Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.

Helman, "The Octopus", Forbes Energy & Genius, pp. 454-51, Nov. 24, 2008.

Investopedia.com, "What are leading, lagging, and coincident indicators? What are they for?", http://www.investopedia.com/ask/answers/177.asp, retrieved on Feb. 27, 2012.

Investorwords.com, "lagging indicator", "leading indicator", http://www.investorwords.com/2713/lagging_indicator.html, http://www.investorwords.com/2741/leading_indicator.html.

"The Report of The BP U.S. Refineries Independent Safety Review Panel", Jan. 2007.

Saleri et al., "Data and Data Hierarchy", SPE 21369, pp. 1286-1293, Dec. 1992.

Saleri, "Dawn in the Desert: Saudi High Tech Paying Off at Ghawar", Energy Tribune, pp. 15-17, Sep. 2007.

Saleri et al., "Engineering Control in Reservoir Simulation: Parts I and II", SPE 18305, 1988.

Saleri et al., "The Expanding Role of the Drill Bit in Shaping the Subsurface", JPT, pp. 53-58, Dec. 2003.

Saleri, "Haradh III: A Milestone for Smart Fields", JPT, Nov. 2006.

Saleri, "'Learning' Reservoirs: Adapting to Disruptive Technologies", JPT, pp. 57-60, Mar. 2002.

Saleri, "The Next Trillion: Anticipating and Enabling Game-Changing Recoveries", JPT, Apr. 2006.

Saleri, "Reservoir Management Tenets: Why They Matter to Sustainable Supplies", JPT, pp. 28-30, Jan. 2005.

Saleri, "Reservoir Performance Forecasting: Acceleration by Parallel Planning", JPT, pp. 652-657, Jul. 1993.

Saleri et al., "Shaybah-220: A Maximum-Reservoir-Contact (MRC) Well and Its Implications for Developing Tight-Facies Reservoirs", SPE Reservoir Evaluation &.

Saleri, "Tenets and Diagnostics in Modern Reservoir Management", 8th International Forum on Reservoir Simulation, Jun. 2005, Stressa, Italy.

Schlumberger.com retrieved from WayBack Machine, http://web.archive.org/web/20071230014516/http://www.slb.com/.

Slide from 2003 Presentation by Joe Ault.

Society of Petroleum Engineers, "Petroleum Resources Management System"; SPE/World Petroleum Council; Published Apr. 2007.

U.S. Appl. No. 12/392,891, filed Feb. 25, 2009, Office Action dated Dec. 8, 2010.

U.S. Appl. No. 12/392,891, filed Feb. 25, 2009, Notice of Allowance dated Mar. 24, 2011.

U.S. Appl. No. 12/606,027, filed Oct. 26, 2009, Office Action dated Aug. 10, 2011.

U.S. Appl. No. 12/915,278, filed Oct. 29, 2010, Office Action dated Nov. 7, 2011.

U.S. Appl. No. 12/567,361, filed Sep. 25, 2009, Office Action dated Nov. 30, 2011.

U.S. Appl. No. 12/567,404, filed Sep. 29, 2009, Office Action dated Dec. 8, 2011.

U.S. Appl. No. 12/606,027, filed Oct. 26, 2009, Final Office Action dated Jan. 19, 2012.

U.S. Appl. No. 12/567,361, filed Sep. 25, 2009, Notice of Allowance dated Feb. 2, 2012.

U.S. Appl. No. 12/567,404, filed Sep. 25, 2009, Notice of Allowance dated Feb. 7, 2012.

U.S. Appl. No. 12/915,278, filed Oct. 29, 2010, Final Office Action dated Mar. 1, 2012.

U.S. Appl. No. 13/282,297, filed Oct. 26, 2011, Office Action dated Apr. 1, 2013.

U.S. Appl. No. 13/282,297, filed Oct. 26, 2011, Final Office Action dated Sep. 11, 2013.

(56) References Cited

OTHER PUBLICATIONS

U.S. Appl. No. 13/282,297, filed Oct. 26, 2011, Advisory Action dated Nov. 18, 2013.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
Cordazzo et al., "Interblock Transmissibility Calculation Analysis for Petroleum Reservoir Simulation", Federal University of Santa Catarina, Nov. 2002, pp. 1-18.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Yin "Geomechanics-Reservoir Modeling by Displacement Discontinuity-Finite Element Method" University of Waterloo, 2008, p. 1-141.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
Society of Petroleum Engineers, "Guidelines for the Evaluation of Petroleum Reserves and Resources"; SPE in associate with World Petroleum Congresses and American Association of Petroleum Geologists, 2001; pp. 1-139.
U.S. Appl. No. 13/282,272, filed Oct. 26, 2011, Final Office Action dated Dec. 9, 2015.
Ham, Jerry, Ranking of Texas Reservoirs for Application of Carbon Dioxide Miscible Displacement, Apr. 1996.
Rivas et al., "Ranking Reservoirs for Carbon Dioxide Flooding Processes", 1994.
U.S. Appl. No. 13/282,282, filed Oct. 26, 2011, Notice of References cited dated Nov. 30, 2015.

\* cited by examiner

EFFICIENT RECOVERY OF PETROLEUM FROM RESERVOIR AND OPTIMIZED WELL DESIGN AND OPERATION THROUGH WELL-BASED PRODUCTION AND AUTOMATED DECLINE CURVE ANALYSIS

CROSS REFERENCE TO RELATED APPLICATION

This application claims the benefit of U.S. Provisional Patent Application No. 62/042,326, filed Aug. 27, 2014, the disclosure of which is incorporated herein in its entirety.

BACKGROUND

Hydrocarbon reservoirs are exploited by drilling wells in a hydrocarbon bearing geologic formation. Producing wells (producers) are drilled to allow hydrocarbons to flow to the surface. The key to efficient recovery of petroleum from a petroleum reservoir is to efficiently design, place, and operate wells. In order to guide and optimize well design, placement, and operation, accurate forecasts of future well behavior are necessary.

A widespread method used to forecast the production behavior of petroleum wells is known as decline-curve analysis (DCA). Decline curve analysis is a type of engineering analysis that uses an analytical functional form, the decline curve, to represent physical well production behavior. The decline curve is based on an integral form of the mass conservation equation enforced on the drainage volume of the well and reformulated to express the variation of the well production rate over time. Three main types of decline curves are used: exponential, parabolic and hyperbolic. Each type is used for a specific type of well. The DCA process remain the same in all cases: the decline curve is fitted through the recent historical behavior of the well production rate and is then used to extrapolate the well behavior forward in time. The predictions obtained through DCA are usually a conservative estimate of the amount of fluids to be produced by a given well.

One of the key difficulties in applying DCA is the complexity of the well production data. To analyze large reservoirs, portfolios of fields, or even entire companies, it is not uncommon that hundreds or even thousands of wells must be measured and analyzed. The production history of each well may contain reporting errors and/or noise. Applying DCA on a field therefore typically requires a significant amount of manpower to review each individual well and identify the best decline curve to represent changes in the physical production of the well. In addition to being a slow and painstaking process, this analysis is also subject to the bias of each analyzing engineer.

BRIEF SUMMARY

Disclosed herein are computerized methods and systems used by engineers to efficiently and accurately design, place, and operate production wells of a petroleum reservoir. Embodiments presented here allow decline-curve analysis (DCA) to be automatically applied to a set of producing wells. These embodiments include a method to automatically detect the last key production event in a production history of a producing well, which is the point at which the regression of the decline curve should be started, and further include a regression method robust enough to handle noisy production data generated by or for the producing well, and a method to analyze the decline probabilistically, in order to quantify the uncertainty in the forecast.

Embodiments described herein are directed to automatically detecting an event in a production curve, generating a production estimate using a quantile regression approach, and performing a probabilistic decline curve analysis. In one embodiment, a computer system identifies a candidate break point in a production decline curve, where the production decline curve represents a decline in material production at a well. The computer system identifies a first trend for the production decline curve occurring before the candidate break point, where the first trend provides a basis for a first material production decline estimate.

The computer system also identifies a second trend for the production decline curve occurring after the candidate break point, where the second trend provides a basis for a second material production decline estimate. The computer system calculates the difference between the first material production decline estimate and the second material production decline estimate and identifies the candidate break points where the difference between the first material production decline estimate and the second material production decline estimate is beyond a threshold value. Identifying the candidate break points allows generation of accurate material production forecasts for the well. These material production forecasts provide data that is configured to control well production components. The computer system also uses generalized cross-validation technique and optimum bandwidth selection method to find a robust estimate of such break points.

In another embodiment, a computer system performs a method for generating a production estimate using a quantile regression. The computer system accesses portions of well by well production history data for a specified reservoir and analyzes the accessed portions of production history data to determine how the production history is to be fit to a material production decline curve. The computer system then fits the accessed production history data to the material production decline curve using quantile regression and generates a production rate estimate for a specified percentile. The production rate estimate provides an indication of whether the specified reservoir's production rate will be at or above the specified percentile.

In yet another embodiment, a computer system performs a method for performing a probabilistic decline curve analysis. The computer system at first accesses well by well material production history data for a specified reservoir (or field) and analyzes the accessed portions of material production history data to determine how the material production history is to be fit to a material production decline curve. The computer system then fits the accessed production history data of a well to a material production decline curve using quantile regression and generates a production rate estimate for a specified percentile, where the prediction estimate provides an indication of estimated future production from the specified well at or above the specified percentile. Generating the production rate estimate for the specified percentile further allows generation of reservoir production controls that are implemented according to the production rate estimate. The computer system also uses a sampling approach (e.g. Monte Carlo sampling) from the individual well by well predictions using a statistical distribution function to estimate the probabilistic production rate estimate in the reservoir (or field) level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
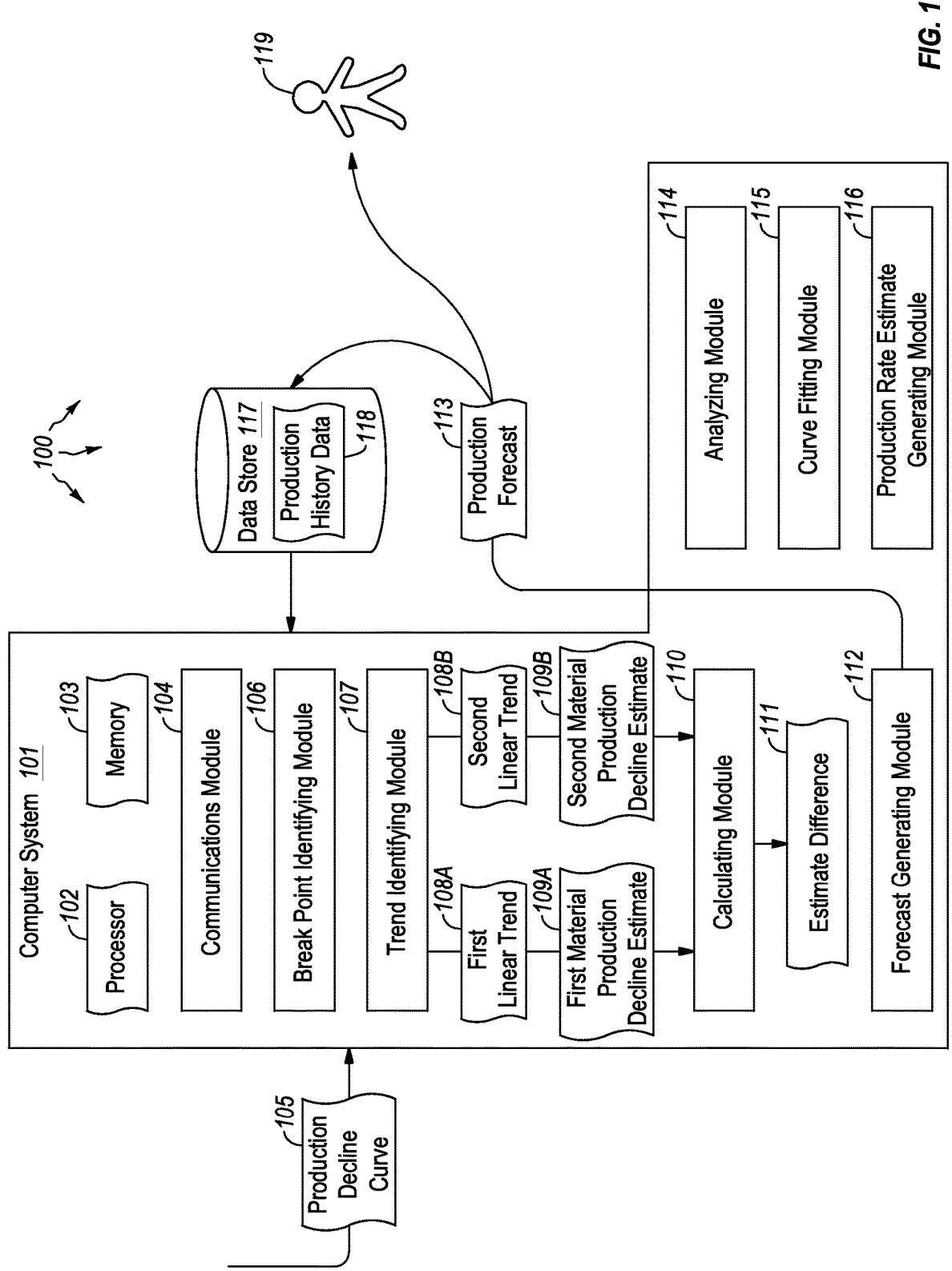
FIG. 1 illustrates a computer architecture in which embodiments described herein may operate including automatically detecting an event in a production curve.

Disclosed herein are computerized methods and systems used by engineers to efficiently and accurately design, place, and operate production wells of a petroleum reservoir. Embodiments described herein are directed to automatically detecting an event in a production curve, generating a production estimate using a quantile regression approach, and performing a probabilistic decline curve analysis. In one embodiment, a computer system identifies a candidate break point in a production decline curve, where the production decline curve represents a decline in material production at a well. The computer system identifies a first trend for the production decline curve occurring before the candidate break point, where the first trend provides a basis for a first material production decline estimate.

The computer system also identifies a second trend for the production decline curve occurring after the candidate break point, where the second trend provides a basis for a second material production decline estimate. The computer system calculates the difference between the first material production decline estimate and the second material production decline estimate and identifies the candidate break points where the difference between the first material production decline estimate and the second material production decline estimate is beyond a threshold value. Identifying the candidate break points allows generation of accurate material production forecasts for the well. These material production forecasts provide data that is configured to control well production components. The computer system also uses generalized cross-validation technique and optimum bandwidth selection method to find a robust estimate of such break points.

In another embodiment, a computer system performs a method for generating a production estimate using a quantile regression. The computer system accesses portions of well by well production history data for a specified reservoir and analyzes the accessed portions of production history data to determine how the production history is to be fit to a material production decline curve. The computer system then fits the accessed production history data to the material production decline curve using quantile regression and generates a production rate estimate for a specified percentile. The production rate estimate provides an indication of whether the specified reservoir's production rate will be at or above the specified percentile.

In yet another embodiment, a computer system performs a method for performing a probabilistic decline curve analysis. The computer system at first accesses well by well material production history data for a specified reservoir (or field) and analyzes the accessed portions of material production history data to determine how the material production history is to be fit to a material production decline curve. The computer system then fits the accessed production history data of a well to a material production decline curve using quantile regression and generates a production rate estimate for a specified percentile, where the prediction estimate provides an indication of estimated future production from the specified well at or above the specified percentile. Generating the production rate estimate for the specified percentile further allows generation of reservoir production controls that are implemented according to the production rate estimate. The computer system also uses a sampling approach (e.g. Monte Carlo sampling) from the individual well by well predictions using a statistical distribution function to estimate the probabilistic production rate estimate in the reservoir (or field) level.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system"

is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The computing module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 further includes a break point identifying module 106. The break point identifying module 106 may be configured to identify candidate break points in production history data 118. This production history data 118 may correspond to one or more currently or previously active oil or gas wells, or wells that produce other materials. The production history may provide an indication of how much oil, gas or other material was produced at the well over time. The break point identifying module 106 may be used to analyze the production history data 118 and determine where events have occurred that have caused changes in production. In some cases, these may be sharp, abrupt changes in production, while in other cases, these changes may be more gradual. The trend identifying module 107 may identify linear trends before and after a candidate break point or event. For instance, the trend identifying module 107 may identify a first linear trend 108A which occurs before a candidate break point, and a second linear trend 108B which occurs after the candidate break point. The first linear trend forms the basis for the first material production decline estimate 109A, and the second linear trend forms the basis for the second material production decline estimate 109B. The material production decline estimate provides an indication of how much material the well will likely produce in the future over time.

As the first material production decline estimate 109A is based on the first trend which occurs before a candidate break point, and as the second material production decline estimate 109B is based on the second trend which occurs after the candidate break point, each production decline estimate will be different (i.e. it will provide different estimated decline values). As such, the calculating module 110 may be used to calculate the difference in the two estimate values (109A and 109B) and provide the estimate difference 111 to the forecast generating module 112. If the difference in the two material production decline estimates is beyond a threshold value, then the candidate break point is identified as an actual break point, and a material production forecast can be generated based on that breakpoint.

As the term is used herein, "decline curve analysis" refers to a curve fitting procedure used for analyzing declining production rates and forecasting future performance of oil and gas wells. Certain types of standard curves are fit based on the past production performance (i.e. production history data 118) which are then extrapolated to predict the future well performance. It is a tool for estimating recoverable reserves and can be used when the production history 118 is long enough that a decline trend can be identified (e.g. 108A). A decline curve analysis methodology is presented herein which can be automatically run on a computer system without any human interaction and with minimum possible errors. At least some decline curve analysis techniques are derived from Arp's equation, where three types of decline curves have been identified: exponential, hyperbolic, and harmonic. Decline curve analysis is fundamentally an empirical process based on historical observations of well performance. It is implicitly assumed, when using decline curve analysis, the factors causing the historical decline continue unchanged during the forecast period. These factors include both reservoir conditions and operating conditions. Some of the reservoir factors that affect the decline behavior include: pressure depletion, number of producing wells, reservoir characteristics, saturation changes, relative permeability etc. Similarly, operating conditions such as separator pressure, tubing size, choke setting, work-overs, compression, operating hours, artificial lift etc. can also influence the decline behavior. As long as these conditions do not change, the trend in decline can be analyzed and extrapolated to forecast future well performance. If these conditions are altered, however, for example through a well work-over, then the decline rate determined pre-workover will not be applicable to the post-workover period.

As such, one of the steps included in a decline curve analysis is to find the time points in the history for which the reservoir conditions or operating conditions have changed. Those time points are called "break points" or "events". More specifically, the decline curve analysis may optimally be performed after the most recent change in reservoir or operating condition. The production history data after the last such change may be used to fit the decline trend which can be extrapolated for future prediction. The traditional way to identify those reservoir or operating condition changes is to manually detect for sharp changes in the production history. Such manual detection is prone to subjectivity, error, and bias. Indeed, detecting such changes in an unbiased and objective manner is not possible by a human.

The next step in decline curve analysis to fit the decline trend using the curves as mentioned in Arp's equation. One approach to fit a decline over the historical production data is the method of least-squares which minimizes the sum of the squares of the distances between the observed data and the fitted curve. The main disadvantage of using the method of least squares is that in this method the fitted curve could be heavily influenced by the presence of outliers. The outliers tend to shift the fitted curves towards these extreme points.

In embodiments herein, an automated process is described which can run on a computing system (e.g. 101) without any human interaction. At least some of the parts of this automated process cannot be performed by a human and must, therefore, be performed by a computing system. This computing system may be a special purpose computing system that is custom built for performing these automated processes. In such cases, the special purpose computing system may have specific hardware components including processors or programmable chips that include embedded code designed to perform the automated processes including, for example, detecting events in production curves.

An event detection algorithm may be implemented which automatically detects (sharp) changes in production decline behaviors which may be used to identify a change in reservoir conditions such as pressure depletion, number of producing wells, reservoir characteristics, saturation changes, relative permeability etc. Those sharp changes can also occur as a result of operating conditions change such as separator pressure, tubing size, choke setting, well workovers, compression, operating hours, artificial lift, etc. The event detection algorithm is fully automated and may be implemented in the computing system without any human interaction. As such, these embodiments have multiple advantages: firstly, since the algorithm is fully automated and machine driven, it is very fast, secondly the algorithm is robust and independent of personal bias and is thus less prone to error. The event detection algorithm may be used to find all such changes during the entire production history. These changes may also be used in estimating the differential estimated ultimate recovery after the corresponding reservoir and/or operating condition change.

Still further, traditional methods of automatically fitting decline curves rely on the method of least squares which is very sensitive to outliers. The graphical user interface based method, where engineers draw the fitted curve using some software are subjected to personal bias and are also time consuming. In embodiments herein, a quantile regression-based approach may be used to fit the decline curves based on the production history. The quantile regression based approach is more robust and less sensitive to outliers. Also the quantile regression based approach is independent of the personal bias as it is a completely automated process. Moreover, using a quantile regression-based approach, the decline curves can be fit to substantially any percentile prediction. For example, embodiments herein may be configured to find the statistical P50, P10 and/or P90 prediction curve without any distributional assumption of the fitted errors. It should be noted that the quantile regression-based approach described herein (including the various models of the approach described below), when used with the large quantities of data provided for a decline curve analysis, can only be performed by a computing system. As such, the embodiments described herein are necessarily rooted in computing technology to overcome the problem of accurately determining where to drill for production material.

The traditional way of doing a probabilistic decline curve analysis relies mainly on the user's experience, where the engineers generally use a very conservative fit for the P90 estimate, a moderately optimum fit for the P50 estimate and an optimistic fit for the P10 estimate. As such, the traditional probabilistic method for decline curve analysis is quite subjective to personal bias. Embodiments described herein focus on a probabilistic method which is fully justified by statistical theory, and is also fully automated. One advantage of the quantile regression approach is that the computing system 101 can fit a decline trend that corresponds to any percentile prediction (i.e. it can fit P10, P50, P90 decline curves using the 10th percentile, 50th percentile and 90th percentile curves using the quantile regression method). The computing system 101 can also fit any intermediate percentiles (e.g. P40 or P75). Using these percentile predictions in the well level, a Monte Carlo sampling approach may be used to find the probabilistic estimates of the predictions in the field/reservoir level. Another method for probabilistic decline curve analysis is using the statistical prediction interval approach which relies on the assumption that noise in the data are independent and follows Gaussian distribution. In the quantile regression approach described herein, no distributional assumption about the random noise is needed.

One objective of the event or break point detection method is to efficiently detect the sharp changes in the production history due to reservoir condition changes and/or operational changes. These break points or "knot points" in the fitted regression curve are implemented in decline curve analysis, as the decline curves fitted before such a break point will not be applicable to the post-break point period. Thus, if the break points are detected with a certain level of accuracy, the computing system 101 can fit piecewise decline curves between those events to more accurately predict the future well performance.

If two linear trends are fit, one within a certain interval before the break point and another within a certain interval after the break point, then the difference in trend estimate on the break point from the two linear trends would be significantly large if there is a sharp change in the production behavior. This idea may be extended by fitting two one-sided local polynomial kernel regression in the two intervals before and after the break point and studying the statistical properties of the difference in estimates 111 at the break point from the two regression curves.

Break point detection:

Let $(X_i, Y_i)$, $i=1, 2, \ldots, n$ be the n observation from the production history of a well. Here $X_i$ denotes the time the $i^{th}$ observation and $Y_i$ denotes the corresponding oil or gas production rate. To detect a jump at any given time point x, we consider two one-sided neighborhoods $(x, x+h]$ and $(x, x-h]$ with bandwidth h. Then we find the local polynomial kernel estimator of the right and left limits at x in the two intervals $(x, x+h]$ and $(x, x-h]$, respectively, by minimizing the following equation:

$$\min_{\beta_0, \beta_1, \ldots \beta_p} \sum_{i=1}^{n} \left[ Y_i - \sum_{j=0}^{p} \beta_j (X_i - x)^j \right]^2 K_l\left(\frac{X_i - x}{h}\right), l = 1, 2. \quad (2.1)$$

where, p is the order of the local polynomial, Bj's are the polynomial coefficients, and $K_1$ and $K_2$ are two density kernel functions with supports $(0, 1]$ and $[-1, 0)$, respectively.

First, the data and the parameters are denoted as vector and matrix notations as follows:

$$\beta = (\beta_0, \beta_1, \ldots, \beta_p)^T,$$

$$Y = (y_1, y_2, \ldots, y_n)^T,$$

-continued $$X_i(x) = (1, (X_i - x), (X_i - x)^2, \ldots, (X_i - x)^p)^T$$

$$X(x) = \begin{bmatrix} X_1(x) \\ X_2(x) \\ \vdots \\ X_n(x) \end{bmatrix} = \begin{bmatrix} 1 & (X_1 - x) & \ldots & (X_1 - x)^p \\ 1 & (X_2 - x) & \ldots & (X_2 - x)^p \\ \vdots & \vdots & \ddots & \vdots \\ 1 & (X_n - x) & \ldots & (X_n - x)^p \end{bmatrix} \text{ and}$$

$$K_l(x) = \begin{bmatrix} K_l\left(\frac{x_1 - x}{h}\right) & 0 & \ldots & 0 \\ 0 & K_l\left(\frac{X_2 - x}{h}\right) & \ldots & 0 \\ \vdots & \vdots & \ddots & \vdots \\ 0 & 0 & \ldots & K_l\left(\frac{X_n - x}{h}\right) \end{bmatrix}, l = 1, 2.$$

Then the objective function 2.1 can be written as $$U(\beta) = Y - X(x)\beta)^T K_l(x)(Y - X(x)\beta), l=1,2. \quad (2.2)$$

Let $f_{p,h}^-(x)$ and $f_{p,x}^+(x)$ represents the left and right limit the estimate at x respectively then it can be shown that $$f_{p,x}^+(h) = e^T [X(x)^T K_1(x) X(x)]^{-1} X(x)^T K_1(x) Y, \quad (2.3)$$

$$f_{p,x}^-(h) = e^T [X(x)^T K_2(x) X(x)]^{-1} X(x)^T K_2(x) Y. \quad (2.4)$$

The criteria for a break point detection is defined by the following statistic $$M_p(x) = f_{p,x}^+(x) - f_{p,x}^-(x). \quad (2.5)$$

If x is a candidate break point then $|M_p(x)|$ should be significantly large. So we can conclude that the point x is a candidate break point is $|M_p(x)| > C$, where C is chosen such that $|M_p(x)| > C) \leq \alpha$, $\alpha$ is the significance level. From the asymptotic distribution of $M_p$ it can be shown that that $$C = Z_{\alpha/2} \sqrt{\frac{2\hat{\sigma}^2 \sum_{j=0}^{2p} K_{j,2} K_{j,1}^*}{nh\|K\|}}, \quad (2.6)$$

Where $\hat{\sigma}^2$ is an consistent estimator of the error variance, $$K_{t1,t2} = \int_0^1 u^{t1} K_1^{t2}(u) du, t_1, t_2 = 0, 1, \ldots,$$

$$K = \begin{bmatrix} K_{0,1} & K_{1,1} & \ldots & K_{p,1} \\ K_{1,1} & K_{2,1} & \ldots & K_{p+1,1} \\ \vdots & \vdots & \ddots & \vdots \\ K_{p,1} & K_{p+1,1} & \ldots & K_{2p,1} \end{bmatrix},$$

$$K_{j,1} = (-1)^{j+1} \begin{vmatrix} K_{1,1} & \ldots & K_{j,1} & K_{j+2,1} & \ldots & K_{p+1,1} \\ K_{2,1} & \ldots & K_{j+1,1} & K_{j+3,1} & \ldots & K_{p+1,1} \\ \vdots & \ddots & \vdots & \vdots & \ddots & \vdots \\ K_{p,1} & \ldots & K_{j+p-1,1} & K_{j+p+1,1} & \ldots & K_{p+1,1} \end{vmatrix},$$

and $$K_{j,1}^* = \sum_{j_1+j_2=jj_1,j_2=0,1,2,\ldots,p} K_{j1,2}^* K_{j2,1}^*.$$

Deleting False Break Points: In the above procedure, certain false break points would be detected around the actual break points if a threshold value, such as C in 2.6 is used in the event detection method. To delete false jump points, Qiu [1994] proposed a modification procedure, briefly described below. Let $\{x_i, i=1, 2, \ldots, 1\}$ be the set of detected jump points satisfying $|M_p(x)| > C$, for $i=1, 2, \ldots, 1$. If there are $r_1 < r_2$ such that the distance between any two consecutive points in $\{x_{r1}, x_{r1+1}, \ldots, x_{r2}\}$ is smaller than or equal to h, $x_{r1} - x_{r1-1} > h$, and $x_{r2+1} - x_{r2} > h$, then we say that $\{x_{r1}, x_{r1+1}, x_{r2}\}$ forms a tie in $x_i$, $i=1, 2, \ldots, 1$ and the entire tie set is replaced by its central point or the median for estimating the break points.

Generalized Cross Validation:

Let $\{x_{t1}, x_{t2}, \ldots, x_{tm}\}$ be m final break points after deleting the ties. The computing system 101 may be configured to fit piecewise decline trends (exponential, harmonic for hyperbolic) between each of the determined break points. The quantile regression method (described further below) may be used to fit those piecewise decline curves where the fitted curve represents the P50 estimate. But these m break points selected by the above method may not be the optimum choice; hence, these fitted piecewise decline curves between the selected break points often over fit the production history. In order to avoid this over fitting, a generalized cross validation (GCV) technique may be implemented.

The generalized cross validation is a form of regularization: it trades off goodness-of-fit against model complexity. Let $\{\hat{Y}_i, i=1, 2, \ldots n\}$ be the fitted values of the piecewise decline curve at the original data points, then, the means square error is given by $$MSE = \frac{\sum_{i=1}^{n}(Y_i - \hat{Y}_i)^2}{n}.$$

The corresponding generalized cross validation (GCV) is given by:

$$CV = \frac{MSE}{(1 - C/n)^2},$$

where, $C-(1+k)m$ and k is the penalty parameter generally taken between 2 and 3. Thus the GCV formula adjusts (i.e. increases) the training mean square errors to take into account the flexibility of the number of break points. We penalize the number of break points because models that are too flexible tend to model the specific realization of noise in the data instead of just the systematic structure of the data. Generalized Cross Validation is so named because it uses a formula to approximate the error that would be determined by leave-one-out validation. We use backward elimination method with the generalized cross validation technique described above to come up with the model which have the minimum cross validation error.

The GCV formula adjusts (i.e. increases) the training mean square errors to take into account the flexibility of the number of break points. The number of break points may be penalized because models that are too flexible tend to model the specific realization of noise in the data instead of just the systematic structure of the data. Generalized Cross Validation is so named because it uses a formula to approximate the error that would be determined by leave-one-out validation. A backward elimination method may be implemented with the GCV technique described above to come up with the model that has the minimum cross validation error.

Bandwidth Selection: the previous algorithm may be repeated for all possible values of bandwidth, h, within an interval [$h_{min}$, $h_{max}$] and choose h for which the corresponding final mean square error (after the cross validation) is minimum.

Figure 5:
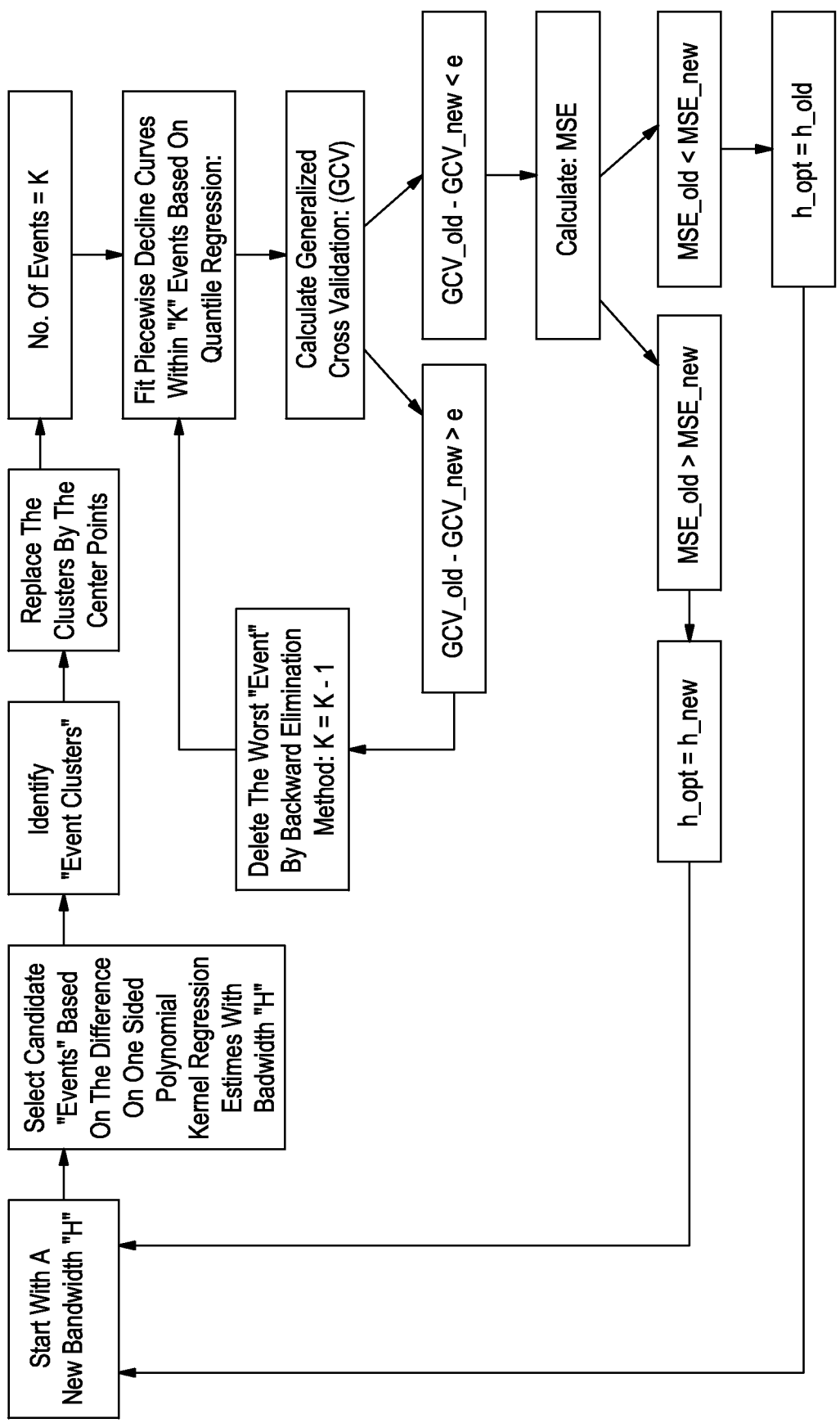
FIG. 5 illustrates a flowchart of an alternative example method for automatically detecting an event in a production curve.

One example algorithm embodiment is described below with reference to FIG. 5: Step 1: Select an h between hmin and hmax, say h*. Step 2: Select candidate knows {x1, x2, ..., x_l1} based on the difference of two one sided local polynomial kernel regression method. Step 3: Delete the false knots by the detecting ties and replacing the set of ties with the median of the ties. Let {xi1, xi2, ..., x_il} is new set of knots after deleting the ties. Step 4: Fit piecewise decline curves (exponential, harmonic or hyperbolic) between each of these intervals within the knots and calculate the mean square error. Step 5: Use generalized cross validation technique to overcome over fitting by deleting knots using backward elimination method. Let {xi1, xi2, ..., x_im} be the final set of knots, then we again calculate mean square error of the corresponding fitted piecewise decline curves. Step 6: Repeat Step 2 to Step 5 for a different h and select the optimum value of h for which the corresponding mean square error is minimum.

The conventional way of automatically fitting decline curve on the production history is to use least square based regression methods where the sum of the squared distances between the hyperbolic curve and the observed production history is minimized. The fitted curve is often assumed to be the P50 estimate, which is not correct as the assumption of the least square method is that mean of the random error is zero; hence, the fitted line is actually a mean regression line not the 50th percentile line. The least squares method is also very sensitive to outliers and influential points. The two main assumptions of the least square regression method (i.e. the uncorrelated observations and equality of variance) may also not be valid in many cases. As such, the quantile regression method may be implemented which is insensitive to outliers and influential points and also does not require assumptions about the distribution of the data.

The model for the quantile regression method response is given by:

$$Y_i = Y_0 \exp(-D(X_i - X_0)) + \epsilon_i, \text{ (for exponential model)}, \quad i = 1, 2, \ldots, n, \quad (3.1)$$

$$= \frac{Y_0}{(1 + bD_i(X_i - X_0))^{1/b}}, \text{ (for hyperbolic model)}, i = 1, 2, \ldots, n. \quad (3)$$

Where, $$Q_p(Y_i | Y_i) = Y_0 \exp\left(-D(X_i - X_0) \text{ or } \left(\frac{Y_0}{(1 + bD_i(X_i - X_0))^{1/b}}\right)\right)$$

is the pth quantile of Y when $X - X_i$ and $\epsilon_i$ is the random error in prediction. So the only assumption of the quantile regression function is $Q_p(\epsilon_i) = 0$, i.e., the pth quantile of the random error is zero. The estimates of $Y_0$ and D ($Y_0$, D and b) are obtained by minimizing the objective function given by:

$$\Delta = p \sum_{d_i \geq 0} |d_i| + (1-p) \sum_{d_i < 0} |d_i|, \text{ where } d_i = Y_i - Q_p(Y_i | X_i) \quad (3.3)$$

When p=0.5 the prediction estimate is provided for the median or the 50$^{th}$ percentile, which is also known as the P50 estimates. p=0.9 gives the prediction estimate for the 90$^{th}$ percentile which is also known as the P10 estimate. Similarly, p=0.1 gives the prediction estimate for the 10$^{th}$ percentile which is also known as the P90 estimate. Note that here P10 signifies that the probability of obtaining production rates high than or equal to P10 is 0.10, i.e., probability of obtaining production rates less than or equal to P10 is 0.90

In order to check whether the assumption, $Q_p(\epsilon i) = 0$, is met for the fitted regression we plot the distribution of residuals, $r_i = Y_i - \hat{Y}_i$ and check whether the pth quantile of the distribution is close to zero. For example FIG. 3.1 shows fitted quantile regression curve (on the left) and the corresponding residual plot (on the right) for a given oil production history. We can see that the pth quantile (50th quantile or median in this case) of the residuals is zero which is marked by the red vertical line in the residual plot.

Probabilistic Decline Curve Analysis: Older methods include using a prediction interval approach on a well-by-well basis, fitting decline curves where it is assumed that the random noise in the data are independent and follow a Gaussian distribution. These assumptions may not be valid in many cases. In embodiments herein, a quantile regression approach may be implemented the P10, P50 and P90 estimates are achieved by fitting the corresponding quartile regression function. The estimates in the field level may be obtained through a Monte Carlo (or other) sampling approach from the well by well probabilistic decline curves. The probabilistic method described herein is justified by statistical theory and is also fully automated, keeping it free of personal bias.

The p-Gaussian distribution is a three-parameter distribution obtained by combining two Gaussian distribution given as follows: If Y follows a p-Gaussian distribution with parameters ($\sigma_1^2, \sigma_2^2$), then the p.d.f of Y is given by:

$$f_Y(y) = \begin{cases} \frac{1}{(\sqrt{2\pi}\sigma)} \exp\left(-\frac{(y-\mu)^2}{\sigma_1^2}\right), \\ \frac{1}{(\sqrt{2\pi}\sigma)} \exp\left(-\frac{(y-\mu)^2}{\sigma_2^2}\right), \end{cases} \quad (4.1)$$

The corresponding c.d.f is of Y is given by:

$$F_Y(y) = P(Y \leq y) = \begin{cases} \Phi\left(\frac{y-u}{\sigma 1}\right), y \leq \mu \\ \Phi\left(\frac{y-u}{\sigma 2}\right), y > \mu \end{cases} \quad (4.2)$$

where $\Phi$ is the c.d.f of the standard Normal Distribution

As discussed above, a quantile regression method may be used to fit the P10, P50 and P90 curves which are further extrapolated to estimate the P10, P50 and P90 estimates of the remaining reserves for each well. The p-Gaussian distribution as defined above is fit to the remaining reserves distribution for each well which has the flexibility to accommodate non-symmetric skewed distributions. Embodiments described herein may be configured to estimate three parameters $\mu$, $\sigma_1^2$, $\sigma_2^2$ of the p-Gaussian distribution by using the three quantiles P10, P50 and P90 using the following equations:

$$F_Y(P50) = .05 \Rightarrow \Phi\left(\frac{P50-\mu}{\sigma 1}\right) = 0.5 \Rightarrow \left(\frac{P50-\mu}{\sigma 1}\right) = 0. \quad (4.3)$$

So we have, $\mu = P50$ $$F_Y(P90) = 0.1 \Rightarrow \Phi\left(\frac{P90-P50}{\sigma 1}\right) = 0.5\left(\frac{P90-P50}{\sigma 1}\right) = 1.2816, \quad (4.4)$$

So we have $\sigma_1 = \left(\frac{P50-P90}{1.2816}\right)$

Similarly we have $$\sigma_1 = \left(\frac{P10-P50}{1.2816}\right) \quad (4.5)$$

Monte-Carlo (or another type of) analysis may be performed to find the probability distribution of the total remaining reserves in the reservoir/field by assuming that the remaining reserves for each well follows a p-Gaussian distribution with the parameters estimated from the P10, P50 and P90 curves.

Figure 7A:
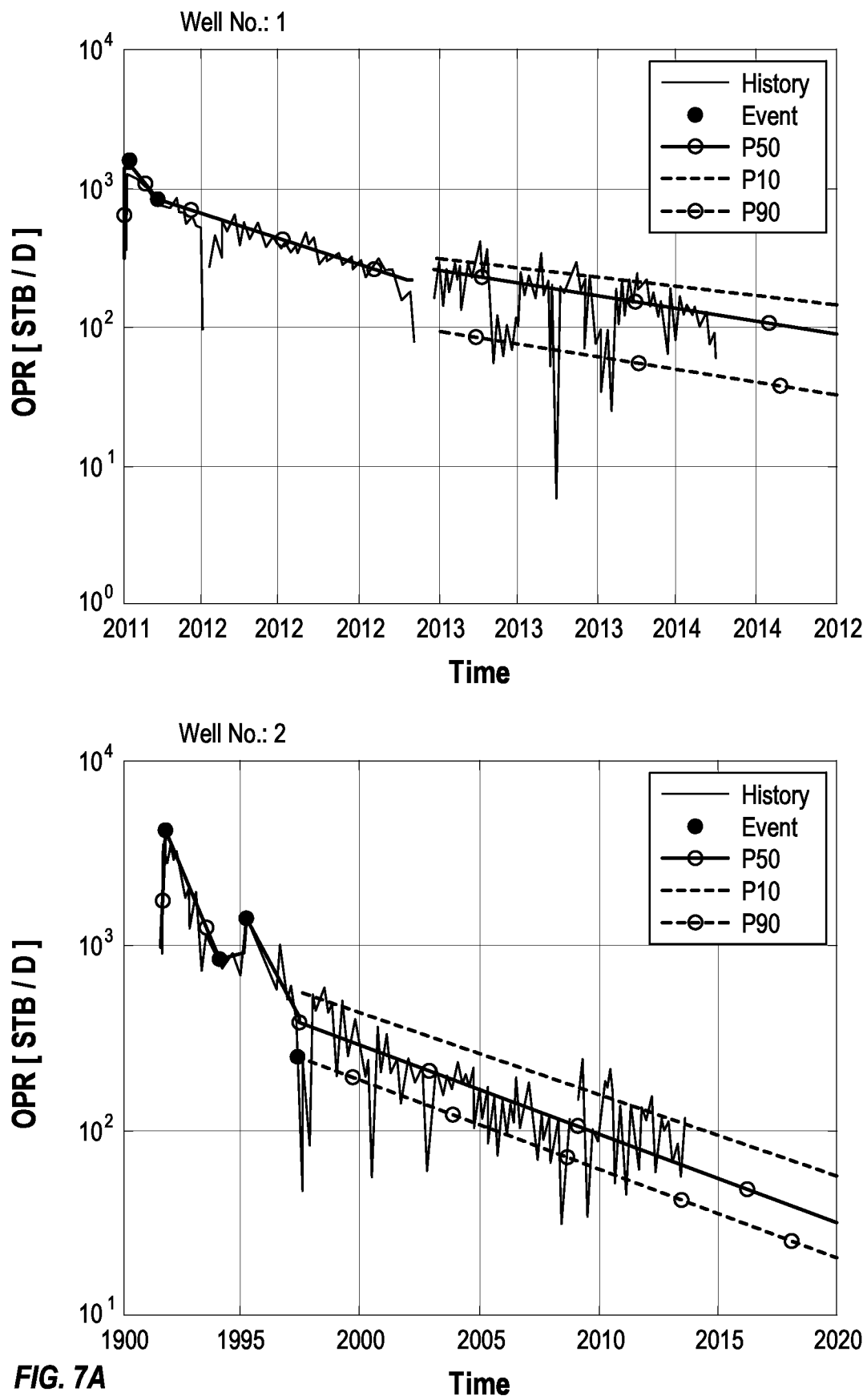
FIG. 7A illustrates probabilistic decline curves with events for Well No. 1 (top) and probabilistic decline curves with events for Well No. 2 (bottom).
Figure 7B:
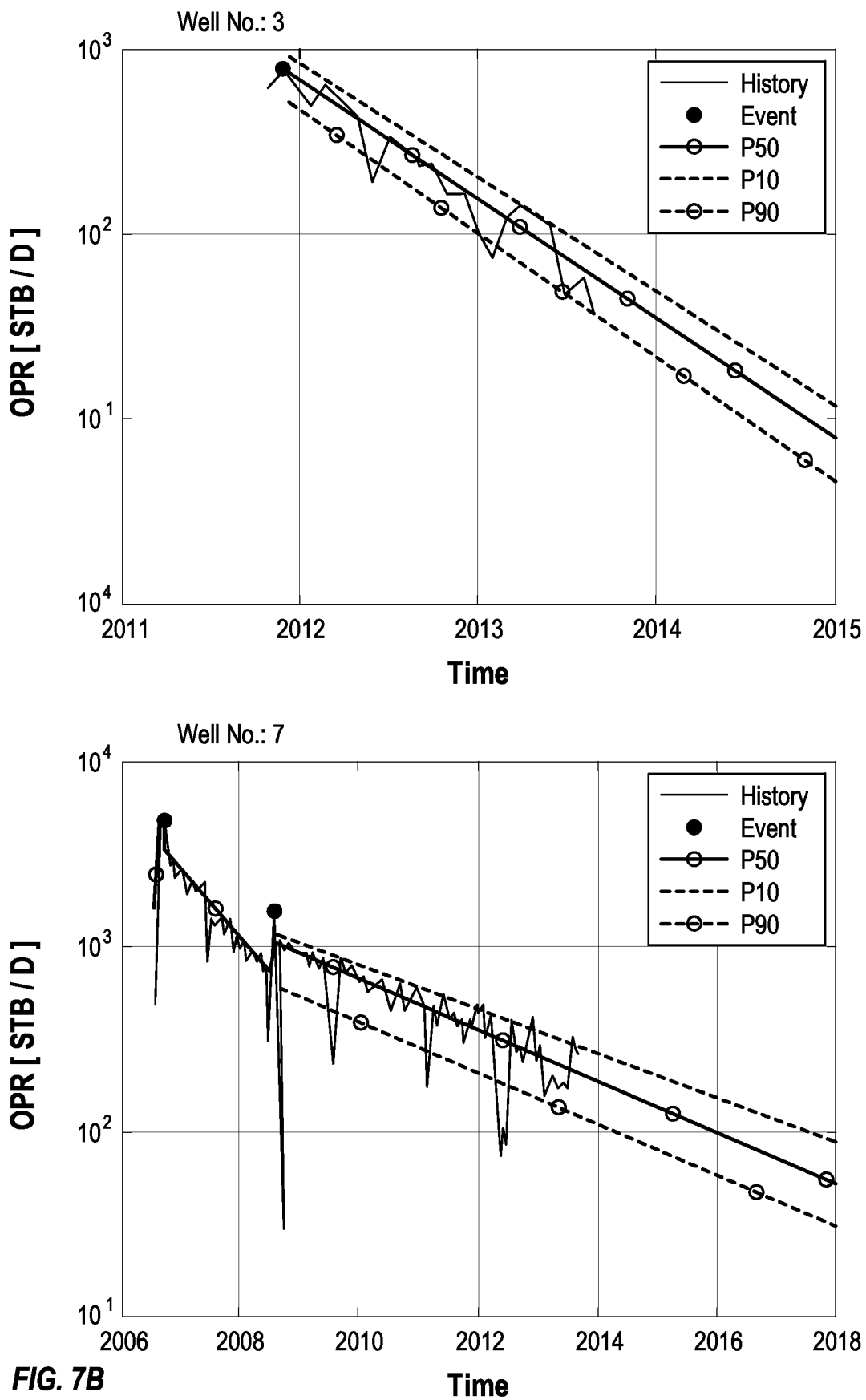
FIG. 7B illustrates probabilistic decline curves with events for Well No. 3 (top) and probabilistic decline curves with events for Well No. 7 (bottom).
Figure 7C:
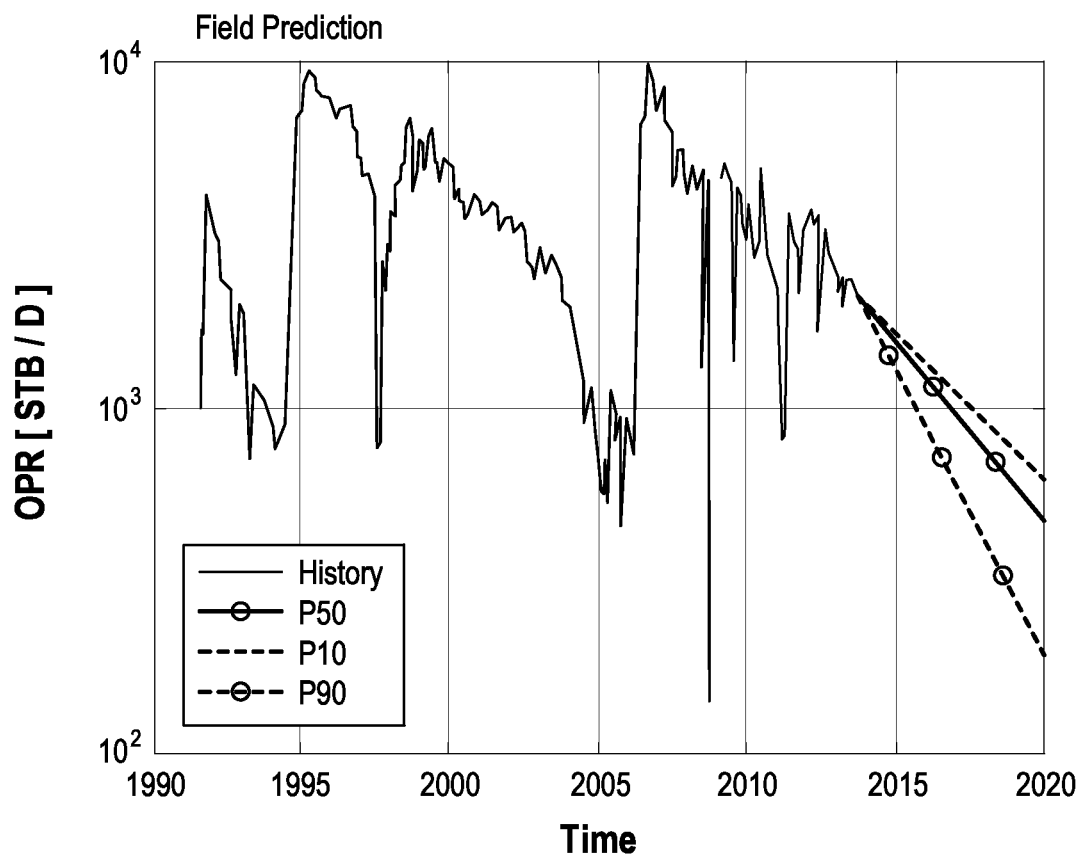
FIG. 7C illustrates a probabilistic prediction in the field level where oil production is in log scale (top) and a probabilistic prediction in the field level where oil production is in original scale (bottom).
Figure 7C:
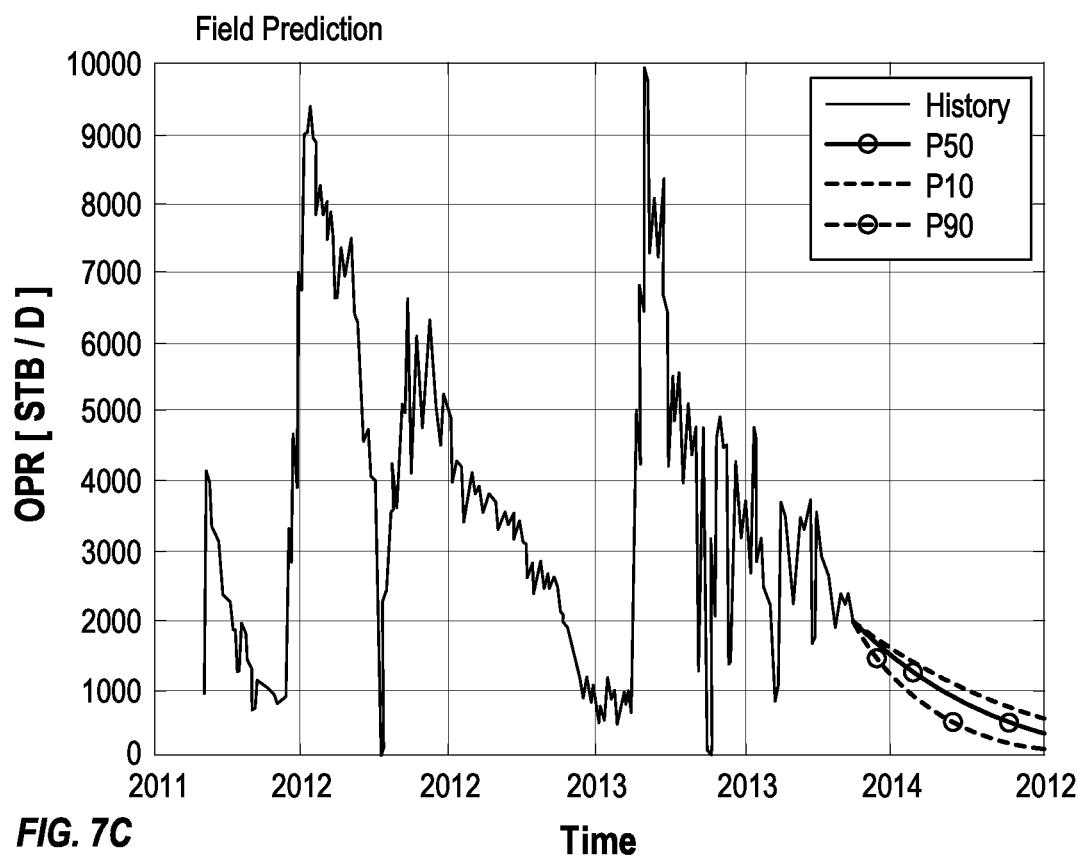

The methodology described above may be applied to actual, currently operating oil fields. The production data is typically recorded monthly. The production data may be used in the decline curve analysis. The well-by-well automated decline curve analysis may be carried out using the algorithms described above with a probabilistic approach. The oil production history and the probabilistic decline curve estimates are shown in FIGS. 7A and 7B. Monte Carlo sampling approach is carried out for the probabilistic prediction in the field level. The field prediction for the oil rates are shown on FIG. 7C. During September, the oil field had nine active wells with oil production rates approximately 2100 stock tank barrel per day. The effective annual decline rate for the field is 20% for the P50 estimate 17% for the P10 estimate and 31% for the P90 estimate. These concepts will be explained further below with regard to methods 200, 300 and 400 of FIGS. 2, 3 and 4, respectively.

Figure 2:
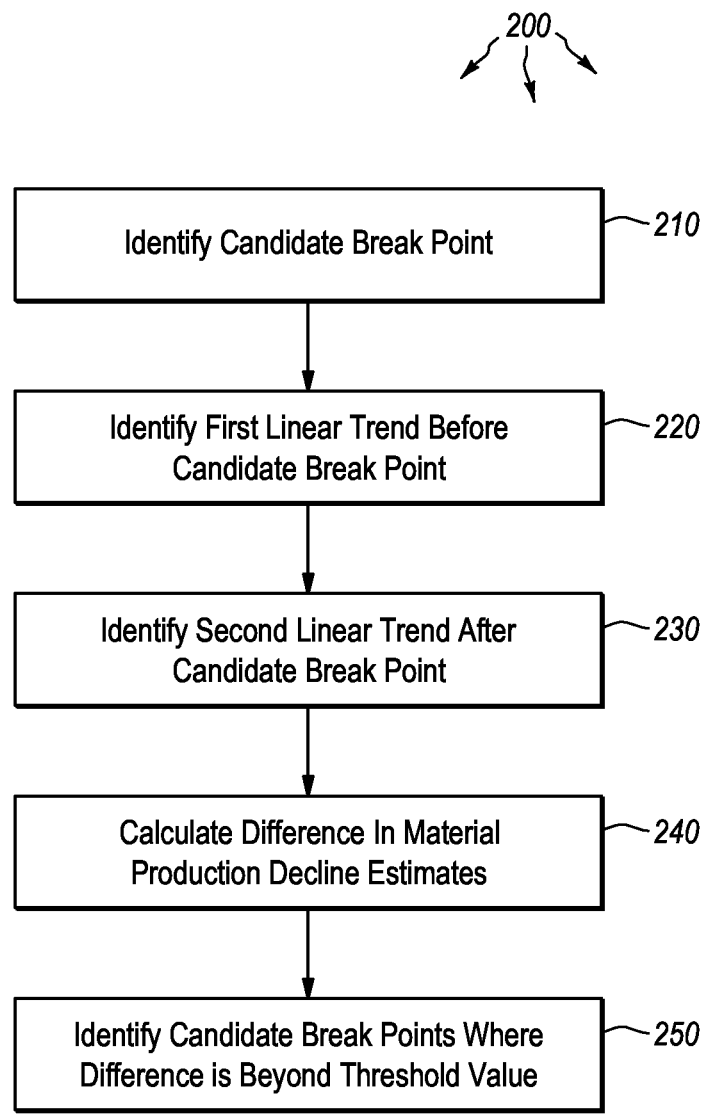
FIG. 2 illustrates a flowchart of an example method for automatically detecting an event in a production curve.
Figure 3:
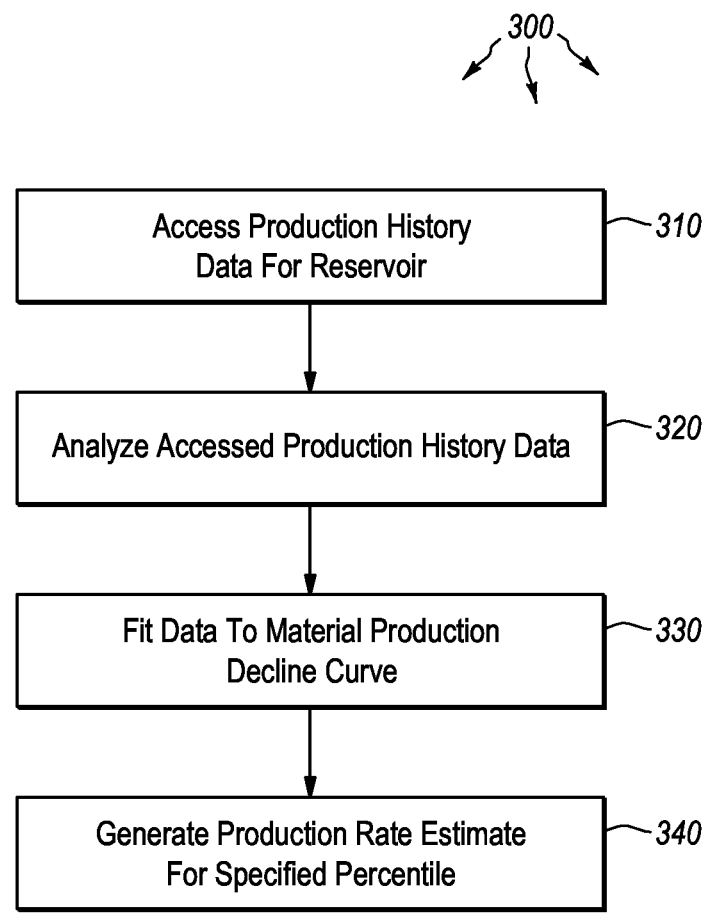
FIG. 3 illustrates a flowchart of an example method for generating a production estimate using a quantile regression.
Figure 4:
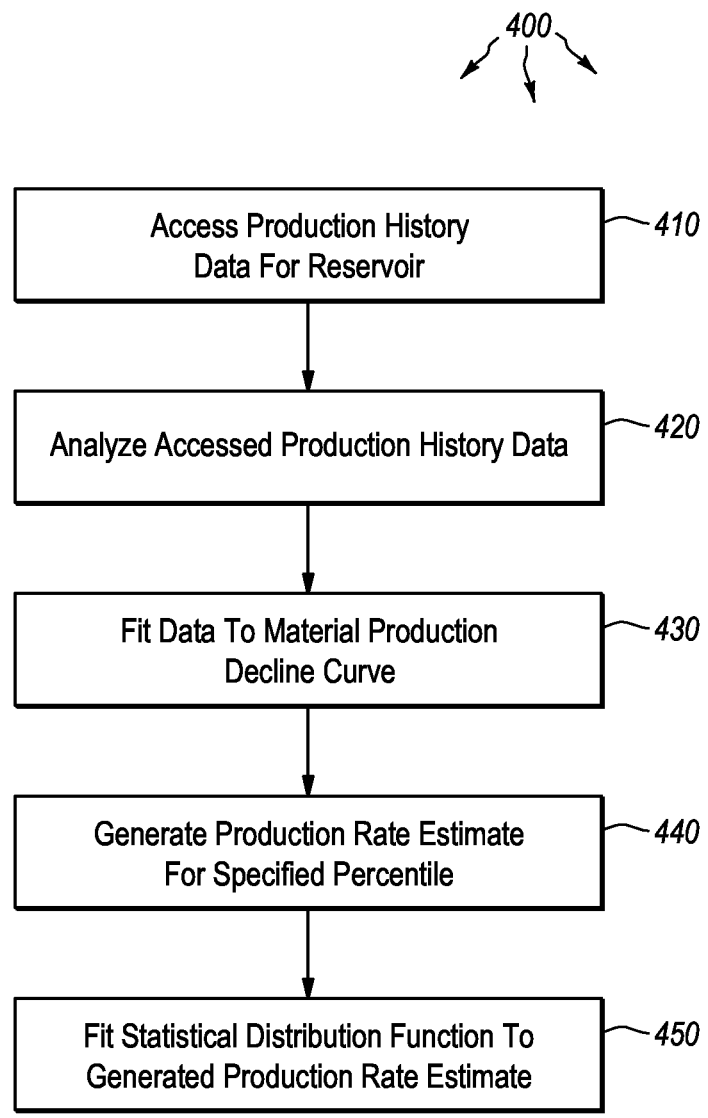
FIG. 4 illustrates a flowchart of an example method for performing a probabilistic decline curve analysis.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for automatically detecting an event in a production curve. The method 200 will now be described with frequent reference to the components and data of environment 100. Prior to detecting an event in a production curve, various physical steps may take place to generate the data included in the production curve. For instance, embodiments herein may include steps of designing, placing and operating a well. In one embodiment, a computer system may be used to design a well including its components and their placement, along with a plan for extracting material from the ground. The method may further include physically placing the drilling equipment at the planned well site and beginning operation. Each of these steps may be carried out by or directed according to a computerized well production plan.

Steps conducted prior to detecting an event in a production curve may also include taking measurements of well production using instruments, transducers, and other physical measurement devices. These measurement devices may measure a variety of different occurrences and operations associated with the well. The measurements may occur over time, and may be recorded by a computer system and stored in a data store. This data may then be accessed by a computing system in order to automatically detect an event in a production curve, as is explained in Method 200 below.

Method 200 includes identifying a candidate break point in a production decline curve, the production decline curve representing a decline in material production at a well (210). For example, the break point identifying module 106 may identify a candidate break point in a production decline curve 105. The production decline curve 105 may be associated with production history data 118 stored in data store 117. Indeed, the production decline curve may be based on a portion of the production history data and may project future well production along the decline curve. Candidate break points may represent potential events or knot points in the production decline curve. These candidate break points are ultimately verified to ensure that they are actual break points and not momentary slowdowns in production. In some cases, candidate break points may be identified for multiple different points along the production decline curve, wherever sharp changes in production are determined to have occurred.

Method 200 next includes identifying a first trend for at least a portion of the production decline curve occurring before the candidate break point, the first trend providing a basis for a first material production decline estimate (220), and further includes identifying a second trend for at least a portion of the production decline curve occurring after the candidate break point, the second trend providing a basis for a second material production decline estimate (230). The trend identifying module 107 may identify a first trend 108A within the production decline curve 105, and may also identify a second trend 108B within the production decline curve 105. These trends may form the bases of the first and second material production decline estimates 109A and 109B, respectively. The first and second material production decline estimates may each represent different values, and may provide an indication of material production decline at a certain point in a production decline curve. The difference in the two estimate values may indicate whether a candidate break point is an actual break point or not. For example, if the first and second estimate values (109A and 109B) are within a threshold (i.e. the values are relatively close to each other), the candidate break point is most likely not an actual break point. Whereas if the first and second estimate values (109A and 109B) are beyond a threshold value, the candidate break point is most likely an actual break point and is identified as such.

Accordingly, method 200 includes calculating the difference between the first material production decline estimate and the second material production decline estimate (240). The calculating module 110 of computer system 101 calculates the difference between the first material production decline estimate 109A and the second material production decline estimate 109B and identifies the candidate break points where the estimate difference 111 is beyond a threshold value (250). If the difference between the first material production decline estimate and the second material production decline estimate is determined to be beyond a threshold value, the candidate break point is confirmed as an actual break point in the production decline curve.

In some cases, the threshold value for the estimate difference 111 may be user-definable and adjustable for each well. Thus, each well may have its own estimate difference threshold, allowing some wells to have more drastic production changes and not have a break point, or to have rather minor production changes and flag them as break points. Using the identified break point, the forecast generating module 112 may generate a production forecast 113 indicating what production is likely to be for a well in the future. Identifying the candidate break points allows generation of accurate material production forecasts for the well. The break points identify events or changes in material production data. Once the break points are identified, a computer system may facilitate generation of a material production forecast. These material production forecasts provide data that is configured to control well production components. Indeed, well components including drilling rigs may be controlled based on the material production forecast data. Operation of the drill may commence, halt, change direction (even slightly) or may make other changes as a direct operational result of the generated forecast.

In some cases, a special purpose computer system may be used to perform the method acts of method 200. The special purpose computer system may include a hardware processor or microprocessor that is custom built for processing and carrying out the method acts of method 200. The special purpose computer system may include volatile and/or non-volatile memory which may have stored thereon embedded code for performing the method 200. The special purpose computer system may be configured to communicate with other computer networks or other generic or special purpose computer systems to communicate the results of the method 200. In some cases, the special purpose computer system may be configured to generate a production forecast based on the identified break points. This production forecast may be used to control physical material production equipment, either directly or indirectly.

In some embodiments, the confirmed break points may be cross-validated. The break points may be cross-validated using the Generalized Cross Validation (GCV) technique as explained above. As such, break points may be cross-validated to ensure their accuracy. Having accurate break points leads to a more accurate production forecast 113. The forecast for future material production at a given well includes an indication of a future production rate for the well that is adjusted according to reservoir factors or operating conditions. The reservoir factors may include pressure depletion, the number of producing wells, reservoir characteristics, saturation changes and/or relative permeability. The operating conditions may include separator pressure, tubing size, choke setting, well work-overs, compression, operating hours and/or artificial lift. These reservoir factors and operating conditions may change the forecast or may be incorporated during the generation of the production forecast 113.

For instance, if one of the operating conditions such as compression changes, it may have a small or large effect on the future production. Similarly, if a reservoir factor changes such as the number of producing wells, it may have a small or large effect on future production depending on how many wells are added or removed and the size of the wells that are added or removed. In some cases, the computer system 101 may be further configured to estimate a differential estimated ultimate recovery after a specified reservoir factor or operating condition has changed in relation to the well. This differential value represents the difference in production forecast value based on the change in reservoir factor and/or operating condition. In some cases, the calculating module 110 may determine that the difference between the first material production decline estimate 109A and the second material production decline estimate 109B is equal to or below a threshold value, and may indicate that the candidate break point is a false break point.

FIG. 3 illustrates a flowchart of a method 300 for generating a production estimate using a quantile regression. The method 300 will now be described with frequent reference to the components and data of environment 100 of FIG. 1.

Figure 6:
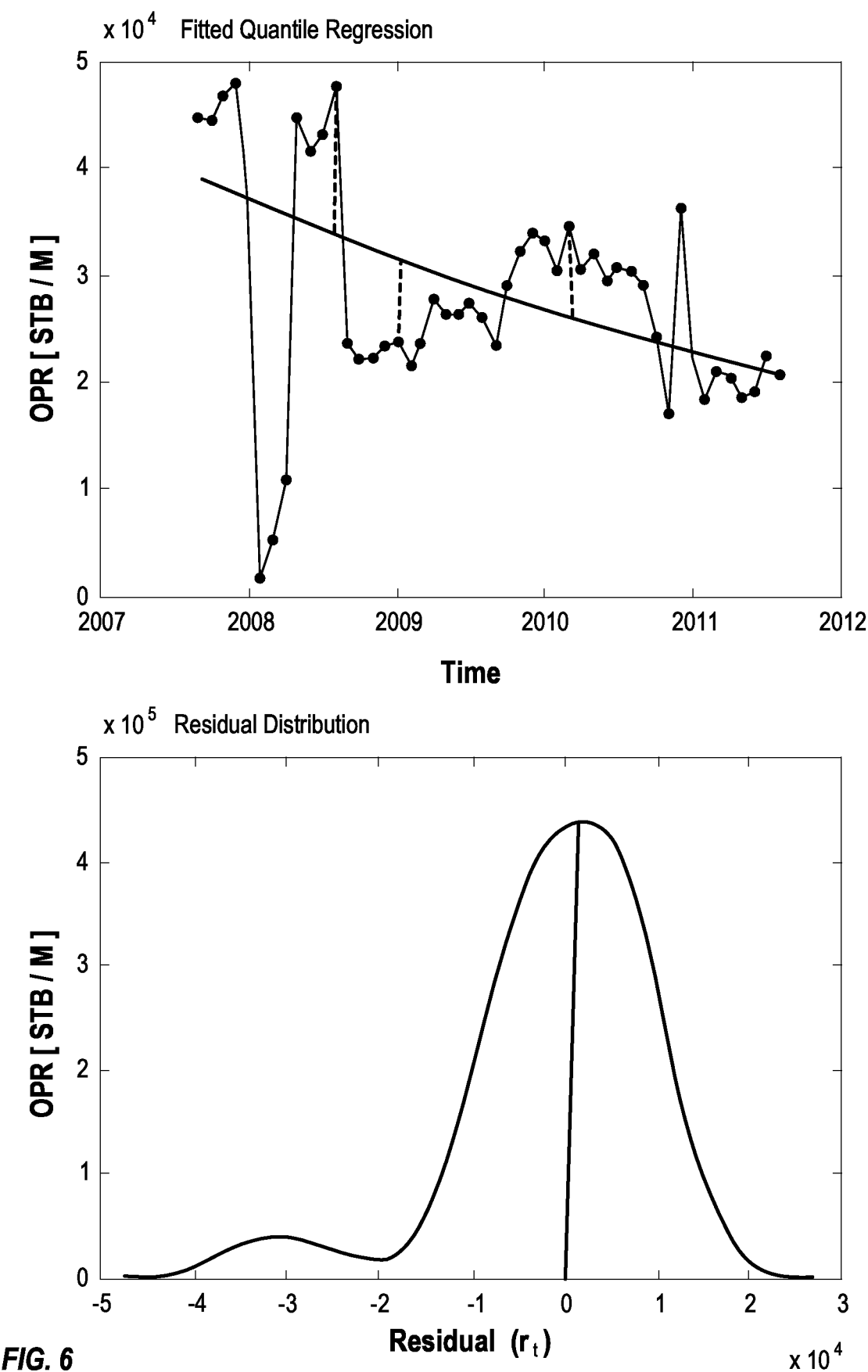
FIG. 6 illustrates a fitted quantile regression (top) and a residual distribution (bottom).

Method 300 includes accessing one or more portions of production history data for a specified reservoir (310). For example, computer system 101 may access material production history data 118 which may be stored in data store 117 or some other local or remote data store. The analyzing module 114 of computer system 101 may analyze the accessed portions of material production history data 118 to determine how the material production history is to be fit to a material production decline curve (320). The curve fitting module 115 may then fit the accessed production history data to the material production decline curve using quantile regression (330) (as generally shown in FIG. 6). The production rate estimate generating module 116 may then generate a production rate estimate for a specified percentile (340). As such, the production rate estimate provides an indication of whether the specified reservoir's production rate will be at or above the specified percentile over a specified amount of time (340).

The production rate estimate may be generated according to a predefined statistical P10, P50 or P90 curve, or may be generated according to a user-selected statistical curve (such as a P25 curve or a P80 curve). In this manner, a user may select any statistical curve for fitting the production history data to the production decline curve. The accessed production history data may be fit to the material production decline curve at a determined break point (as determined by module 106). The determined break point identifies the occurrence of an event during the well's production history. As mentioned above, the break point is determined by identifying changes in the material production decline curve that are larger than a specified threshold level. Once a break point is determined, material production for a well can accurately be determined for points occurring after the break point.

As with method 200, a special purpose computer system may be used to perform the method acts of method 300. The special purpose computer system may include a hardware processor or microprocessor that is custom built for processing and carrying out the method acts of method 300 and/or the method acts of method 400 (addressed below). The special purpose computer system may include volatile and/or non-volatile memory which may have stored thereon embedded code for performing the method 300. The special purpose computer system may be configured to communicate with other computer networks or other generic or special purpose computer systems to communicate the results of the method 200. In some cases, generating the production rate estimate for the specified percentile further allows generation of reservoir production controls implemented according to the production rate estimate. This production rate estimate may thus be used to control physical material production equipment, either directly or indirectly.

FIG. 4 illustrates a flowchart of a method 400 for performing a probabilistic decline curve analysis. The method 400 will now be described with frequent reference to the components and data of environment 100 if FIG. 1.

Method 400 includes accessing one or more portions of production history data for a specified reservoir (410). As above, the computer system 101 may access production history data 118 from data store 117. The production history may cover all or merely portions of a well's production history. The production history data may be specific to a single well, or may cover a grouping or system of wells. The analyzing module 114 of computer system 101 may analyze the accessed portions of production history data 118 to determine how the production history is to be fit to a material production decline curve (420). The curve fitting module 115 may fit the accessed production history data to a material production decline curve 105 using quantile regression (430). Quantile regression may provide an accurate fitting that is less susceptible to outliers, as occurs when using the least squares method. The production rate estimate generating module 116 may then generate a production rate estimate for a specified percentile, where the prediction estimate provides an indication of estimated future production from the specified reservoir at the specified percentile (440).

Method 400 further includes fitting at least a first statistical distribution function to the generated production rate estimate for the specified percentile (450) for individual wells. For example, the curve fitting module 115 may fit a statistical distribution function (e.g. a P10, P50 or P90 curve as described above) to the production rate estimate of wells. In some cases, various forms of sampling (e.g. Monte Carlo sampling) may be implemented to find a probabilistic estimate of the production rate in the reservoir (or field) level. In this manner, fitting the accessed production history data to a material production decline curve using quantile regression may be performed without involving distributional assumptions about random noise in the production history data.

Indeed, at least in some cases, it need not be assumed that noise in the production data follows a Gaussian distribution. Generating the production rate estimate for the specified percentile may allow generation and implementation of reservoir production controls implemented according to the production rate estimate. This production rate estimate may thus be used to control physical material production equipment, either directly or indirectly. The production rate estimate may, for example, specify that production in that reservoir should proceed or halt, or may be more successful if performed in a different manner. Providing a more accurate curve fit may provide the basis for a more accurate production forecast, which in turn provides more solution-oriented use of reservoir production equipment.

Accordingly, methods, systems and computer program products are provided which automatically detect an event in a production curve. Moreover, methods, systems and computer program products are provided which generate a production estimate using a quantile regression and which perform a probabilistic decline curve analysis.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for generating a material production estimate using a quantile regression, the method being performed at a computer system including at least one processor, to increase petroleum recovery from a specified reservoir by implementing one or more reservoir production controls based on the material production estimate, the method comprising:

the at least one processor accessing one or more portions of material production history data for a specified reservoir;

analyzing the accessed portions of material production history data to determine how the material production history data are to be fit to a material production decline curve, wherein the accessed portions of material production history data are fit to the material production decline curve at a determined break point, the determined break point identifying an occurrence of a sharp change in production decline behavior during the material production history of the specified reservoir;

the at least one processor fitting the accessed portions of material production history data to the material production decline curve using quantile regression, wherein for an exponential model:

$$Y_i = Y_0 \exp(-D(X_i - X_0)) + \epsilon_i, i=1,2,\ldots,n$$

and for a hyperbolic model:

$$Y_i = \frac{Y_0}{(1 + bD_i(X_i - X_0))^{1/b}}, i=1, 2, \ldots, n$$

where, $$Q_p(Y_i \mid Y_i) = Y_0 \exp\left(-D(X_i - X_0)\right) \text{ or } \left(\frac{Y_0}{(1 + bD_i(X_i - X_0))^{1/b}}\right)$$

is a pth quantile of Y when $X=X_i$ and $\epsilon_i$ is a random error in prediction and $Q_p(\epsilon_i)=0$;

generating a production rate estimate for a specified percentile, the production rate estimate providing an indication of whether the specified reservoir's production rate will be at or above the specified percentile, wherein estimates of $Y_0$ and D ($Y_0$, D and b) are obtained by minimizing an objective function given by:

$$\Delta p \sum_{d_i \geq 0} |d_i| + (1-p) \sum_{d_i < 0} |d_i|, \text{ where } d_i = Y_i - Q_p(Y_i \mid X_i);$$

generating one or more reservoir production controls based on the production rate estimate; and implementing the one or more reservoir production controls at the specified reservoir, wherein the implemented one or more reservoir production controls increases petroleum recovery from the specified reservoir.

2. The method of claim 1, wherein the production rate estimate is generated according to a predefined statistical P10, P50 or P90 curve.

3. The method of claim 1, wherein the production rate estimate is generated according to a user-selected statistical curve.

4. The method of claim 1, wherein the production rate estimate provides an indication of whether a material production rate of the specified reservoir will be at or above the specified percentile over a specified amount of time.

5. The method of claim 1, wherein the determined break point is determined by identifying one or more changes in the material production decline curve that are larger than a specified threshold level.

6. A computer system comprising the following:
one or more processors;
one or more computer-readable storage media having stored thereon computer-executable instructions that, when executed by the one or more processors, cause the computer system to perform a method for performing a probabilistic decline curve analysis to increase petroleum recovery from a specified reservoir by implementing one or more reservoir production controls based on a material production estimate, the method comprising the following:
accessing one or more portions of material production history data for a specified reservoir;
analyzing the accessed portions of material production history data to determine how the material production history data are to be fit to a material production decline curve, wherein the accessed material production history data are fit to the material production decline curve at a determined break point, the determined break point identifying an occurrence of a sharp change in production decline behavior during the material production history of the specified reservoir;
fitting the accessed material production history data to the material production decline curve using quantile regression,
wherein for an exponential model:

$$Y_i = Y_0 \exp(-D(X_i - X_0)) + \in_i, \; i=1,2,\ldots,n$$

and for a hyperbolic model:

$$Y_i = \frac{Y_0}{(1 + bD_i(X_i - X_0))^{1/b}}, \; i = 1, 2, \ldots, n$$

where, $$Q_p(Y_i \mid Y_i) = Y_0 \exp\left(-D(X_i - X_0)\right) \text{ or } \left(\frac{Y_0}{(1 + bD_i(X_i - X_0))^{1/b}}\right)$$

is a pth quantile of Y when $X=X_i$ and $\in_i$ is a random error in prediction and $Q_p(\in_i)=0$;
generating a production rate estimate for a specified percentile, the production rate estimate providing an indication of estimated future production from the specified reservoir at the specified percentile, wherein estimates of $Y_0$ and D ($Y_0$, D and b) are obtained by minimizing an objective function given by:

$$\Delta = p\Sigma_{d_i \geq 0}|d_i| + (1-p)\Sigma_{d_i < 0}|d_i|, \text{ where } d_i = Y_i - Q_p(Y_i|X_i);$$

fitting at least a first statistical distribution function to the generated production rate estimate for the specified percentile;
generating one or more reservoir production controls based on the production rate estimate; and
implementing the one or more reservoir production controls at the specified reservoir, wherein the implemented one or more reservoir production controls increases petroleum recovery from the specified reservoir.

7. The computer system of claim 6, wherein the generated production rate estimate is fit to at least one of a P10, a P50 or a P90 decline curve.

8. The computer system of claim 7, further comprising implementing sampling to find a probabilistic estimate of the production rate estimate as fit to at least one of the decline curves.

9. The computer system of claim 8, wherein the sampling is performed according to the Monte Carlo sampling technique.

10. The computer system of claim 6, wherein fitting the accessed material production history data to the material production decline curve using quantile regression is performed without involving distributional assumptions about random noise in the material production history data.

* * * * *

UNITED STATES PATENT AND TRADEMARK OFFICE
CERTIFICATE OF CORRECTION

PATENT NO. : 10,508,532 B1
APPLICATION NO. : 14/836564
DATED : December 17, 2019
INVENTOR(S) : Mondal et al.

It is certified that error appears in the above-identified patent and that said Letters Patent is hereby corrected as shown below:

On the Title Page

Page 2
Item (56), References Cited, Other Publications, change "Saleri et al; "Shaybah-220: A Maximum-Reservoir-Contact (MRC) Well and Its Implications for Developing Tight-Facies Reservoirs," SPE Reservoir Evaluation &." to –Saleri et al; "Shaybah-220: A Maximum-Reservoir-Contact (MRC) Well and Its Implications for Developing Tight-Facies Reservoirs," SPE Reservoir Evaluation & Engineering.–

In the Specification

Column 11
Line 20, change "represents" to –represent–

Column 12
Line 16, change "for" to –or–
Line 55, change "use backward" to –use a backward–
Line 57, change "have" to –has–

Column 14
Line 26, change "implemented the" to –implemented. The–

Signed and Sealed this
Twenty-fourth Day of March, 2020

Andrei Iancu
*Director of the United States Patent and Trademark Office*